Figure 4:
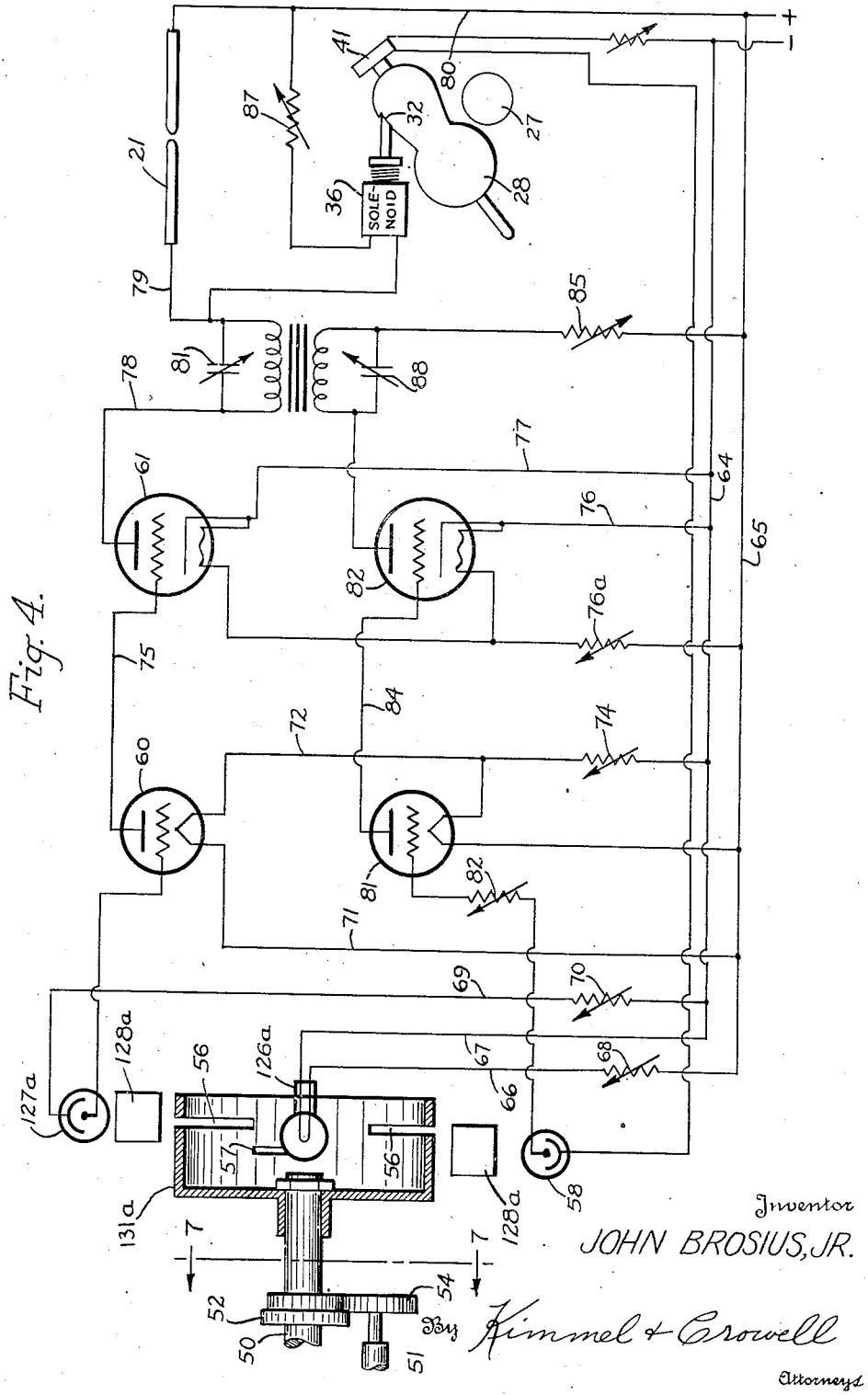

Jan. 4, 1949.  J. BROSIUS, JR  2,458,334
LIGHT CONTROL
Filed Sept. 10, 1946  4 Sheets-Sheet 1
Fig. 1.
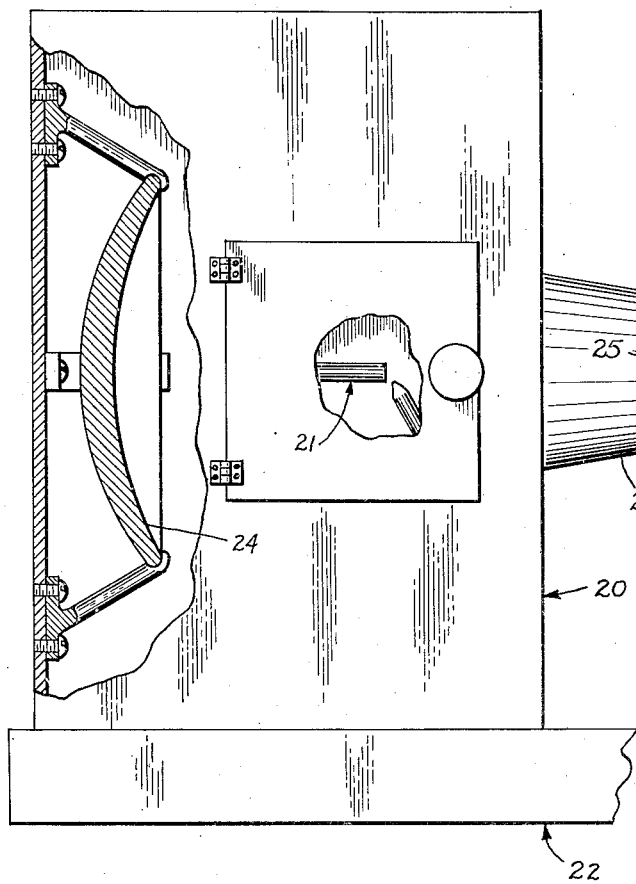
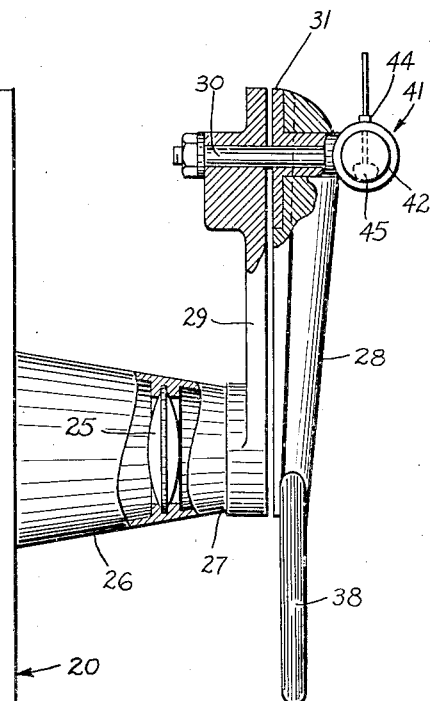
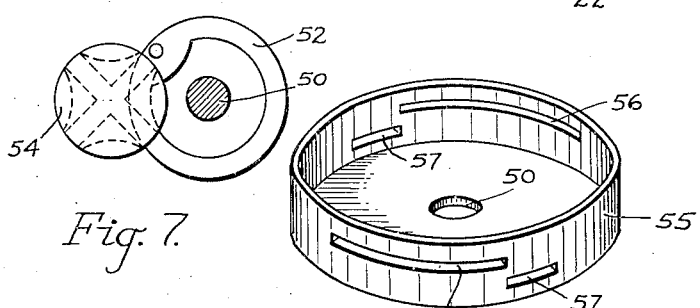
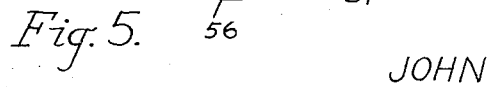
Fig. 7.
Fig. 5.
Inventor
JOHN BROSIUS, JR.
By Kimmel & Crowell
Attorneys Jan. 4, 1949.          J. BROSIUS, JR                 2,458,334
                         LIGHT CONTROL
Filed Sept. 10, 1946                          4 Sheets-Sheet 2
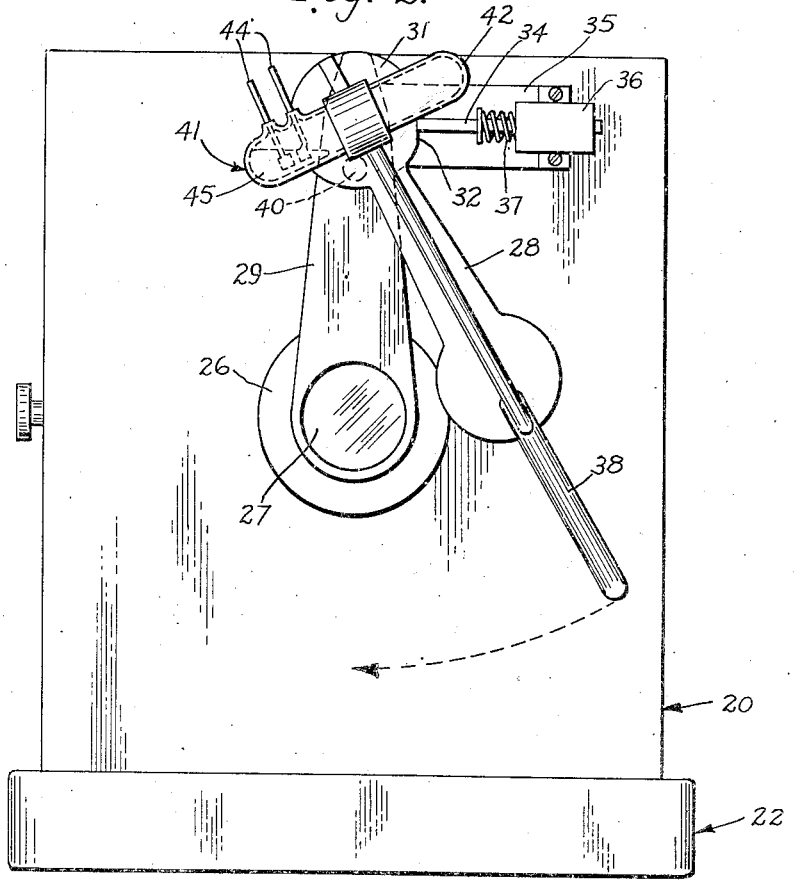
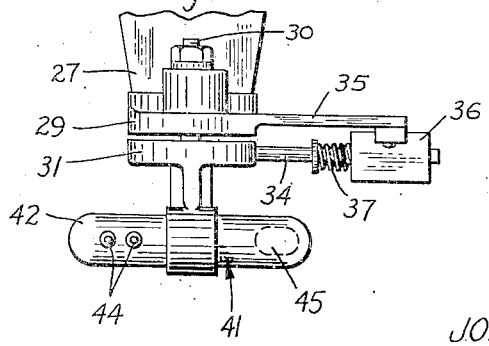
Inventor
JOHN BROSIUS, JR.
By Kimmel & Crowell
                Attorneys Jan. 4, 1949.  J. BROSIUS, JR  2,458,334
LIGHT CONTROL
Filed Sept. 10, 1946  4 Sheets-Sheet 3

Inventor
JOHN BROSIUS, JR.
By Kimmel & Crowell
Attorneys

Jan. 4, 1949.    J. BROSIUS, JR    2,458,334
LIGHT CONTROL
Filed Sept. 10, 1946    4 Sheets-Sheet 4

Inventor
JOHN BROSIUS, JR.
By Kimmel & Crowell
Attorneys

Patented Jan. 4, 1949

2,458,334

UNITED STATES PATENT OFFICE 2,458,334

LIGHT CONTROL

John Brosius, Jr., Seattle, Wash.

Application September 10, 1946, Serial No. 695,969

10 Claims. (Cl. 315—155)

This invention relates to motion picture projection machines and is a division of my copending application for a Stroboscopic motion picture projector, Serial No. 695,968, filed September 10, 1946, and more particularly to a stroboscopic light control for motion picture projectors.

It is an object of this invention to provide an electronic light control for motion picture projectors.

Another object of this invention is to provide an electronic light control for establishing and extinguishing the source of light in a motion picture projector in timed relation to the film passing through the projector whereby the light is established while a frame on the film is being projected on a screen and is extinguished during the time the film is changing frames to be projected.

Another object of this invention is to provide an electronic light control for a motion picture projector and automatic means for closing the light aperture with a dowser when the projector should be inadvertently stopped with the light source established and which will break the circuit to the light source at this time.

With the above and other objects in view, my invention consists in the arrangement, combination and details of construction disclosed in the drawings and specification, and then more particularly pointed out in the appended claims.

Figure 6:
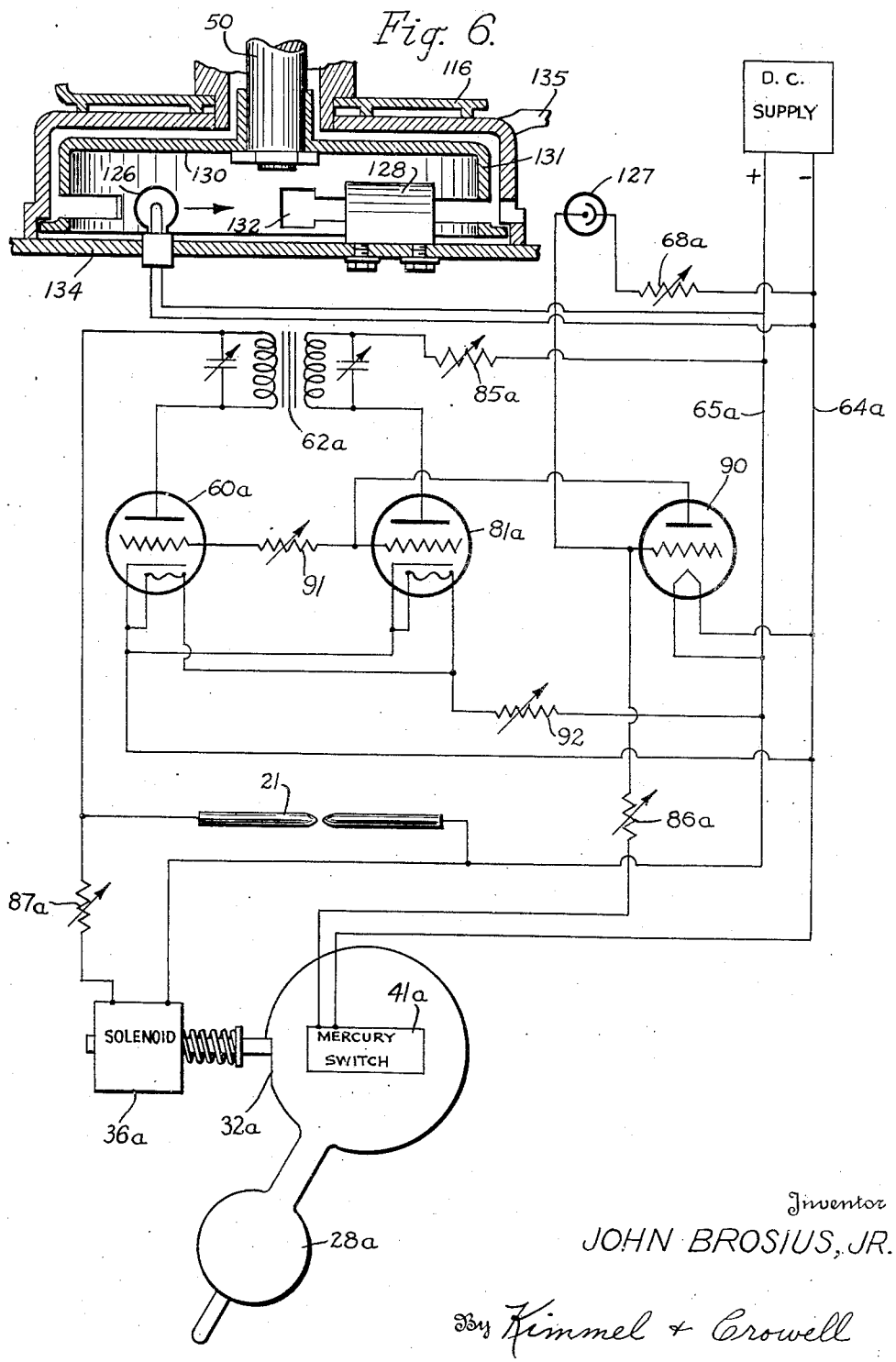

In the drawings,

Figure 1 is a side elevation, partly broken away and partly in section, of a light source for a motion picture projector embodying a principle of this invention, Figure 2 is a front elevation of the light source of Figure 1, Figure 3 is a fragmentary top plan view of the mercury switch in the "off" position, Figure 4 is a diagrammatic view of the electronic circuit, Figure 5 is a perspective view of the light cylinder used in the control exemplified in Figure 4, Figure 6 is a diagrammatic view of the wiring circuit of a modified form of this invention, Figure 7 is a section taken on the line 7—7 of Figure 4.

Referring to the drawings, the numeral 20 designates generally the housing for a source of light for a motion picture projector which may be a pair of carbons 21 between which an arc provides the light necessary for the proper projection of an image on the film. The housing 20 is adapted to be secured onto a base 22, and is provided with a suitable reflector 24 secured to the rear inside wall of the housing 20. A condenser lens 25 is fixed in a frustro-conical support 26 which extends from the front end of the housing 20. The front end 27 of the support 26 provides the aperture for the light from the carbon arc.

A dowser 28 is pivotally carried by a bracket 29 fixed about the aperture 27 and extending upwardly therefrom, in such a manner that the dowser 28 will cover the aperture 27 when it is free to hang from the pivot pin 30 on the bracket 29. The dowser 28 is provided with a disc 31 about the pivot pin 30 and is formed with a notch 32 on one side thereof.

A lock pin 34 is slidably mounted on a bracket 35 fixed on the bracket 29 and engages loosely through a frequency solenoid 36. A spring 37 between the solenoid housing and a pin on the lock pin 34 constantly urges the lock pin 34 outwardly of the solenoid 36 into engagement with the disc 31 and slot or notch 32 in the open or "off" position of the dowser 28. A handle 38 extends from the lower end of the dowser 28 for manually moving the dowser 28 to the "open" position, the lock pin 34 slidably supported on the bracket 29, and which engages in the disc 31. The pin 34 is adapted to be disengaged from the dowser 28 when a steady current is established in the solenoid 36 a sufficient length of time to establish a magnetic field therein. As the solenoid 36 is energized, the dowser 28 will fall gravitatingly on the "on" position, closing the aperture 27.

A mercury switch 41 is carried by the dowser 28 forwardly of and perpendicular to the pivot 30. The mercury switch 41 is formed of an elongated tube 42 having a pair of electrical contacts 44 at one end and a globule of mercury 45 engageable with the contacts 44 when the dowser 28 is in the "off" position, and which is out of contact with the contacts 44 in the "on" position of the dowser 28, whereby the electrical and electronic circuits will be opened and inoperative when the dowser 28 is in the "on" position, closing the aperture 27.

During operation of a motion picture projector, it is desirable to have the light source on as the film is being projected and off as the film is moving the next frame down to be projected. Many devices have been used to synchronize the light with the film and I have developed an electronic control for controlling the light in timed relation with the film. Such a control is shown diagrammatically in Figure 4.

The drive shaft 50, turning at a constant speed, operates the film driving shaft 51 through the intermittently engaging gears 52 and 54 fixed on the shafts 50 and 51 respectively. A light control cylinder 131a is fixed on to the end of the constantly rotating shaft 50 concentric thereto. The cylinder 131a is formed with annular elongated slots 56 through the side walls, and shorter slots 57 laterally adjacent to the slots 56 which start in line with one end of the slots 56, the rear end, following the rotation of the cylinder 131a.

A housing, not shown, covers the cylinder 131a on the side of the projector, and is provided with a cover, slidably adjustable on the housing for synchronizing the electronic control with the film motion. Fixed on the housing cover within the housing, is a small lamp or bulb 126a which provides a light source for the electronic control. The bulb 126a is supported within the cylinder 131a so the light therefrom will pass through the slots 56 and 57. Condensing lenses 128a concentrate the light rays from the slots 56 and 57 onto selenium or photo cells 127a and 58, also fixed on the cover. By shifting the cover, the position of the selenium or photo cells with respect to the film shaft 51 may be adjusted for synchronizing the light control with the film frames to be projected.

The electronic light control comprises a firing circuit and a correlated extinguishing circuit for the carbon arc.

The firing cycle comprises the selenium or photo cell 127a, an amplifier tube 60, a thyratron tube 61 and the primary side of a transformer 62, connected in series with the carbon 21, the transformer having the same number of turns and size of conductors in the primary and secondary thereof. Leads 64 and 65 connect the circuits to a source of direct current supply. The bulb 126a is connected to the leads 64 and 65 by wires 66 and 67, and the strength of the bulb 126a is controlled by a variable resistor 68. One side of the selenium or photo cell 127a is connected to the lead 64 by wire 69 through the resistor 70, and the other side of the cell 127a is connected to the grid of the amplifier tube 60. The filament of the tube 60 is connected to the power through leads 71 and 72, through a resistor 74. The plate of the amplifier tube 60 is in turn connected to the grid of the thyratron tube 61 by a lead 75.

The filament of the thyratron tube 61 and the cathode are connected to the power line 64 in series with the filament and cathode of the thyratron tube in the extinguisher circuit through the leads 76 and 77. The plate of the thyratron tube 61 is connected to one side of the primary windings of the transformer 62 by a lead 78. One carbon 21 is connected to the other side of the primary winding by a lead 79 and the other carbon 21 is connected to the power line 65 by a lead 80. A condenser 81 is connected across the primary windings between the leads 78 and 79 for boosting the counterflow to the plate of tube 61.

In the operation of the firing cycle, the light from the bulb 126a striking the selenium or photo cell 127a causes an electronic flow into the grid of the amplifier tube 60. The energized grid in the tube 60 diminishes the electron flow from the filament to the plate thereof so that the grid of the thyratron tube 61 is not energized, thus allowing electronic flow from the cathode to the plate thereof and causing an electron flow through the primary winding of transformer 62, thence through the carbons 21 to the supply line 65, establishing an arc across the carbons 21.

This arc remains established as long as the slot 56 allows light to strike the cell 127a. The slot 56 allows light to strike the selenium or photo cell 127a while the frame of the film is being projected. As the gears 52 and 54 are engaged to turn the film to the next frame, the slot 56 shuts the light from cell 127a and the slot 57 allows light to strike the selenium or photo cell 58 for extinguishing the arc.

The extinguisher circuit comprises the selenium or photo cell 58, amplifier tube 81, thyratron tube 82 and the secondary winding of the transformer 62. As the light strikes the cell 58, the grid of the amplifier tube is energized through the resistor 82. The filament of the tube 81 is connected to the power lines 64 and 65 through the resistor 74 and as the grid is energized, the flow of electrons from the filament to the plate is diminished. The plate of the amplifier tube is connected to the grid of the thyratron tube 82 by a lead 84 and as the grid of the thyratron tube 82 is deenergized, the electrons may flow from the cathode to the plate thence through the secondary winding of the transformer 62 and to the power line 65 through resistor 85. The flow of current through the secondary winding induces a flow in the opposite direction in the primary, whereby a counter electronic flow is caused to flow to the plate of the thyratron tube 61 in the filing circuit, thereby extinguishing the flow of current to the carbons 21, causing the arc to be extinguished.

After the arc is extinguished, the circuits are in readiness to repeat the cycle when the slot 56 again permits the firing circuit to be again initiated to project the next frame on the film. The firing circuit is in operation while the frame of the film is being projected and the gear 52 is out of engagement with the gear 54, and the extinguishing circuit is in operation while the gears 52 and 54 are engaged for moving the film to the succeeding frame.

The frequency solenoid 36 is connected between the leads 79 and 80, across the arc, and will operate on or below a predetermined set frequency; that is, when the projector is running at operating speed which is far above the operating speed of the frequency solenoid 36, if the speed of the projector should fall below operating speed or stop, the frequency of the electronic flow between the leads 79 and 80 attains the same frequency as, or less than the operating frequency of the solenoid 36, whereupon the solenoid will draw the locking pin 34 out of the dowser 28, allowing the dowser 28 to close the aperture 27, thus opening the mercury switch 41 which is connected between the selenium or photo cell 58 and power line 64 through a resistor 86 for opening the circuit of the extinguisher circuit, and the tube 82 is caused to become inactive by energizing of the grid therein, thus cutting out the extinguisher circuit.

A resistor 87 is connected in series with the solenoid 36 for controlling the sensitivity thereof, and a condenser 88 is connected across the secondary of the transformer 62 for boosting the counterflow to the plate of the tube 82 when the firing circuit is in operation.

The light control circuit as described above is for use with the present type of projector having an intermittent film motion. A modified form of circuit is shown in Figure 6 which is particularly adapted for use with the projector of my copending application, referred to above, which embodies a constant speed film.

The light control as shown in Figure 6 consists of a cylinder 131 fixed on the drive shaft 50, outwardly of the housing of the projector, having a housing 134 about the cylinder 131. The housing 134 is adjustably secured on the projector housing and its position relative to the projector housing is indicated by an indicator 135.

A light bulb 126, condenser lens 128, and selenium or photo cell 127 are fixed to the cover of the housing 134 with the bulb 126 and condenser lens 128 within the cylinder 131. The cylinder 131 is formed with an elongated slot 132 in the walls thereof through which the light from the bulb 126 may strike the selenium or photo cell 127 for actuating the light control circuit. The slots 132 extend 120 degrees around the cylinder 131, having their corresponding sections 180 degrees apart.

The electronic circuit may be condensed from the circuit above described, by using only one selenium or photo cell and one condenser lense. One slot 132, or a series of aligned slots are used and are rotated in timed relation to the film and lens assembly described in my other application, the width of the slots being larger at the rear ends to allow a greater amount of light to strike the cell 127 at the end of the cycle.

With the exception of the extinguisher circuit, the wiring arrangement is similar to that of the diagram of Figure 4. The selenium or photo cell 127 is connected to the grid of the amplifier tube 90. The plate of the tube 90 is connected to the grids of the two thyratron tubes 81a and 60a, and a resistor 91 is connected to the grid of the thyratron tube 60a. The cathode and filaments of the tubes 60a and 81a are controlled by a resistor 92. The plate of the tube 60a is connected to the primary side of transformer 62a and the carbons 21, while the plate of the bulb 81a is connected to the secondary side and through a resistor 85a to the power line 65a. The dowser 28a, with a notch 32a is operated by the frequency solenoid 36a as the dowser 28 of the form described above, together with the mercury switch 41a which is connected to the selenium or photo cell 127 through the resistor 86a.

The operation of this modified form is somewhat different than the first form in the extinguishing circuit. The frequency solenoid 36a operates in conjunction with dowser 28a in the same manner as with the dual selenium or photo cell circuits.

Now let us suppose projector is threaded with film ready for operation. Dowser 28a will be in a position whereby mercury switch 41a is in "on" position. This causes electronic flow to grid in amplifier 90 through resistor 86a to be the same as electronic flow established by selenium or photo cell 127. When light is shining through the narrow portion of slot 132, this allows thyratron tube 60a to fire, but electronic flow at grid of thyratron tube 81a is sufficient to suppress electronic flow from cathode to plate in this same tube. Therefore, electrons will flow from cathode to plate in thyratron tube 60a, and thence through primary of transformer 62a and then to carbons 21 to supply line 65. Thus the arc 129 is established and the variable condenser bridging the primary circuit of transformer 62a is charged to its maximum potential. Now let us suppose the projector is started and brought up to normal operating speed. Dowser 28a is now placed in "off" position. The mercury switch 41a is now in "off" position and allows selenium or photo cell 127 to function. As is depicted in Figure 6, we will suppose that the wide part of slot 132 is now functioning. This allows maximum amount of light to impinge on selenium or photo cell 127, thus allowing maximum electronic flow at the grid in amplifier tube 90, thus allowing electronic flow from filament to plate in this same tube, to be at minimum; thus the electronic flow at the grid in thyraton tube 81a is low enough to allow electrons to flow from cathode to plate in this same tube, thus causing it to fire, thus allowing electronic flow to secondary transformer 62a. This in turn creates an opposite electronic flow in primary of transformer 62a. Thus electrons flow to plate of firing thyratron 60a. This electronic flow plus the accumulated electronic charge in variable condenser which is connected across the primary terminals extinguishes the arc between the cathode and plate in thyratron 60a.

During this de-ionization period the narrow part of slot 132 in light control cylinder 131 is at a point in the rotation of same whereby light from tube 126 is allowed to impinge on selenium or photo cell 127a in sufficient amount to allow thyratron tube 60a to fire with a sufficient electronic flow at grid in thyratron 81a to cause it to hold its fire; thus arc is established at 129 as long as the light from 126 shines through the narrow part of slot 132 during the period of rotation of 131. The extinguisher variable condenser connected across the secondary winding of transformer 62a is now charged by a previous firing action of thyratron 60a. When 131 rotates so the wide part of slot 132 allows the light from 126 to impinge on selenium or photo cell 127a, this allows 81a to fire through secondary of transformer 62a with the electronic discharge of variable condenser in the same secondary winding, creating a counter electronic flow in the firing circuit; thus extinguishing the electronic flow at carbons 21; thus extinguishing arc 129. This completes the cycle of firing and extinguishing of arc 129.

I do not mean to confine myself to the exact details of construction herein disclosed, but claim all variations falling within the purview of the appended claims.

What I claim is:

1. A stroboscopic light control for a motion picture projector comprising a drive shaft rotatable at a constant speed and a light source including a transformer, the light source being connected to one side of the primary winding of said transformer, a thyratron tube connected to the other side of said primary winding for causing an electron flow in said primary winding, a second thyratron tube connected to one side of the secondary winding of said transformer for effecting an electron flow therein in a direction opposite to the flow in the primary thereof, at least one amplifier tube connected to the grid of said thyratron tubes, a light sensitive cell for each of said amplifier tubes for activating the grid thereof whereby the current in said light source is dependent upon the light sensitive cells, a second light source for said light cell, and means actuated in timed relation to said shaft for controlling the light on said light cells whereby the first light source is established and extinguished in timed relation to said shaft.

2. A stroboscopic light control for a motion picture projector comprising a drive shaft, an electronically controlled source of light including a transformer connected to said light source, a thyratron tube for effecting an electron flow in the primary of said transformer for establishing the light source, a thyratron tube for effecting an electronic flow in the secondary of said transformer in a direction opposite to the flow in said primary for extinguishing the light source, and light responsive electronic means connected to the grids of said thyratron tubes for alternately establishing and extinguishing said light source in timed relation to the rotation of said drive shaft.

3. A stroboscopic light control as set forth in claim 2 wherein said means includes an apertured cylinder rotatably connected to said drive shaft, a light bulb fixed in said cylinder, a light sensitive cell fixed outwardly of said cylinder whereby the light from said bulb will pass through said apertured cylinder and actuate said light cells, and an amplifier tube connected between said light cells and said thyratron tubes.

4. A stroboscopic light control as set forth in claim 2 wherein said means includes a light control cylinder rotated by said drive shaft, said cylinder being formed with spaced apart elongated slots through the walls thereof, oppositely disposed light sensitive cells on opposite sides of said cylinder, a light bulb fixed in said cylinder whereby the light therefrom will pass through said slots for actuating said light cells, one of said light cells being operatively connected to one of said thyratron tubes for establishing the light source, and the other of said light cells being operatively connected to the other of said thyratron tubes for extinguishing said light source in timed relation to said shaft and said cylinder.

5. A stroboscopic light control as set forth in claim 2, including a dowser, and means operative upon stopping of said shaft for blocking the aperture of the light source of said projector and breaking the circuit of said extinguishing thyratron tube.

6. A stroboscopic light control for a motion picture projector comprising a drive shaft rotatable at a constant speed, an electronically operated light source, an apertured cylinder fixed on said drive shaft and rotatable therewith, a light source independent of said projector fixed relative to said cylinder whereby the light therefrom may pass through the apertures of said cylinder, at least one light responsive cell actuated by the light through said apertures, and grid controlled arc tubes, controlled by said light cell, in said first light source for establishing and extinguishing the current thereto in timed relation to said rotating cylinder.

7. A stroboscopic light control for a motion picture projector comprising a drive shaft rotatable at a constant speed, an electronically operated light source including a transformer, the primary of said transformer being connected to said light source, a grid controlled arc tube connected to the other side of said primary for actuating said light source, a second grid controlled arc tube connected to the secondary of said transformer for extinguishing the light source, and light responsive electronic means connected to the grids of said arc tubes for alternately establishing and extinguishing said light source in timed relation to the rotation of said drive shaft.

8. A stroboscopic light control for a device comprising a drive shaft, an electronically controlled source of light including a transformer connected to said light source, a thyratron tube for effecting an electron flow in the primary of said transformer for establishing the light source, a thyratron tube for effecting an electronic flow in the secondary of said transformer in a direction opposite to the flow in said primary for extinguishing the light source, and light responsive electronic means connected to the grids of said thyratron tubes for alternately establishing and extinguishing said light source in timed relation to the rotation of said drive shaft.

9. A stroboscopic light control for a motion picture projector comprising a rotating shaft, an electronically controlled source of light including a transformer connected to said light source, a grid controlled arc tube for effecting an electron flow in the primary of said transformer establishing the circuit for said light source, a grid controlled arc tube effecting an electron flow in the secondary of said transformer in a direction opposite to the initial flow in the primary for extinguishing the light source, and means connected to the grids of said tubes for alternately establishing and extinguishing said light source in timed relation to the rotation of said shaft.

10. A stroboscopic light control comprising a rotatable shaft, an electronically controlled light circuit including a transformer, a grid controlled arc tube effecting an electron flow in the primary of said transformer, a grid controlled arc tube effecting an electron flow in the secondary of said transformer in opposition to the flow in the primary, and means associated with said shaft energizing the grids of said arc tubes alternately thereby energizing and extinguishing said light circuit in timed relation to the rotation of said shaft.

JOHN BROSIUS, Jr.

REFERENCES CITED

The following references are of record in the file of this patent:

UNITED STATES PATENTS

| Number | Name | Date |
|---|---|---|
| 1,337,737 | Van der Bijl | Apr. 20, 1920 |
| 1,774,457 | Singleton | Aug. 26, 1920 |
| 1,893,504 | Nicolson | Jan. 10, 1933 |
| 2,084,267 | Hicks | June 15, 1937 |
| 2,170,157 | Pray | Apr. 22, 1939 |
| 2,246,486 | Blackburn | June 17, 1941 |